(12) United States Patent
Presher

(10) Patent No.: US 11,780,406 B2
(45) Date of Patent: Oct. 10, 2023

(54) KIDNAPPING NOTIFICATION SYSTEM

(71) Applicant: Teddy Presher, Boyd, TX (US)

(72) Inventor: Teddy Presher, Boyd, TX (US)

( * ) Notice: Subject to any disclaimer, the term of this patent is extended or adjusted under 35 U.S.C. 154(b) by 0 days.

(21) Appl. No.: 17/563,918

(22) Filed: Dec. 28, 2021

(65) Prior Publication Data

US 2022/0242365 A1   Aug. 4, 2022

Related U.S. Application Data

(63) Continuation of application No. 17/165,633, filed on Feb. 2, 2021, now Pat. No. 11,267,438.

(51) Int. Cl.
*B60R 25/102* (2013.01)
*B60R 25/30* (2013.01)
*B60R 25/10* (2013.01)
*G08B 25/10* (2006.01)

(52) U.S. Cl.
CPC ............ *B60R 25/102* (2013.01); *B60R 25/10* (2013.01); *B60R 25/30* (2013.01); *B60R 25/305* (2013.01); *G08B 25/10* (2013.01)

(58) Field of Classification Search
CPC ... B60R 25/10; B60R 25/1004; B60R 25/102; B60R 25/104; B60R 25/24; B60R 25/30; B60R 25/305; B60R 25/31; B60R 25/33; B60R 25/34; G08B 17/00; G08B 21/00; G05B 19/00; H01H 3/20
See application file for complete search history.

(56) References Cited

U.S. PATENT DOCUMENTS

| | | | | |
|---|---|---|---|---|
| 7,477,136 | B2 * | 1/2009 | Konno | B60R 25/1003 340/5.31 |
| 7,586,401 | B2 * | 9/2009 | Payne | B60R 25/33 701/519 |
| 8,434,639 | B2 * | 5/2013 | Markert | B65D 47/0814 220/826 |
| 10,899,316 | B1 * | 1/2021 | Moeller | G08B 13/00 |

FOREIGN PATENT DOCUMENTS

| | | | |
|---|---|---|---|
| DE | 602005000316 | * | 10/2007 |
| JP | 2006076320 A1 | * | 3/2006 |
| JP | 2012081801 A1 | * | 4/2012 |

OTHER PUBLICATIONS

NPL Search (Jan. 11, 2023).*

* cited by examiner

*Primary Examiner* — Van T Trieu
(74) *Attorney, Agent, or Firm* — The Iwashko Law Firm, PLLC; Lev Ivan Gabriel Iwashko

(57) ABSTRACT

A kidnapping notification system, including a notification device to removably connect to at least a portion of a vehicle, a first display unit disposed on at least a portion of the notification device to alert at least one third party of a threat to a user, and a transmitter removably connected to at least a portion of the vehicle to adjust a position of the notification device.

19 Claims, 12 Drawing Sheets

KIDNAPPING NOTIFICATION SYSTEM

CROSS REFERENCE TO RELATED APPLICATION

This application is a continuation of co-pending U.S. nonprovisional patent application Ser. No. 17/165,633, entitled "Kidnapping Notification System," which was filed on Feb. 2, 2021 and has been issued as U.S. Pat. No. 11,267,438.

BACKGROUND

1. Field

The present general inventive concept relates generally to a notification system, and particularly, to a kidnapping notification system.

2. Description of the Related Art

Unfortunately, kidnapping is one of the most common crimes worldwide. A kidnapper can use a variety of methods to kidnap a victim, including a victim's vehicle. Despite availability of mobile devices, such as cell phones, when the victim is abducted in the victim's vehicle, there is a very low chance that they are capable of contacting authorities and/or alerting others to receive help. The victim is unlikely to be able to call police due to being in a state of physical and/or emotional duress.

Additionally, the victim's vehicle is unlikely equipped to with an emergency feature that allows the victim to notify the police. As such, the kidnapper has a higher chance of succeeding in the crime.

Therefore, there is a need for a kidnapping notification system connected to a vehicle to facilitate notification of the authorities and/or other third parties.

SUMMARY

The present general inventive concept provides a kidnapping notification system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a kidnapping notification system, including a notification device to removably connect to at least a portion of a vehicle, a first display unit disposed on at least a portion of the notification device to alert at least one third party of a threat to a user, and a transmitter removably connected to at least a portion of the vehicle to adjust a position of the notification device.

The notification device may include a base, and a pivoting section pivotally disposed on at least a portion of the base to move in response to use of the transmitter.

The notification device may further include a hinge springingly disposed on at least a portion of the base to move the pivoting section from closed against the base in a first position to at least partially opened away from the base in a second position.

The hinge may move the pivoting section from closed against the base in the first position to at least partially opened away from the base in the second position within three seconds.

The notification device may further include a plurality of springs disposed on at least a portion of a first side and a second side of the base to move the pivoting section from closed against the base in a first position to at least partially opened away from the base in a second position.

The plurality of springs may move the pivoting section from closed against the base in the first position to at least partially opened away from the base in the second position within three seconds.

The notification device may further include a support section disposed on at least a portion of the pivoting section to prevent the pivoting section from moving one-hundred and eighty degrees with respect to the base.

The first display unit may illuminate at least one of a steady light and a flashing light to indicate an emergency.

The first display unit may change at least one of a color and a speed of flashing during operation to increase attention from the at least one third party.

The first display unit may illuminate a particular color that identifies a kidnapping within the vehicle is in progress in response to use of the transmitter.

The first display unit may display a first message to indicate an emergency.

The first display unit may display the first message as at least one of HELP CALL 911 and HELP CALL POLICE.

The first display unit may change the first message during operation to increase attention from the at least one third party.

The kidnapping notification system may further include a second display unit disposed on at least a portion of the notification device to display a second message different from the first message to indicate the emergency.

The kidnapping notification system may further include at least one camera disposed on at least a portion of the pivoting section to record data regarding movement of the notification device during movement of the vehicle and send the data to at least one third party.

The kidnapping notification system may further include a communication unit disposed within at least a portion of the notification device to receive at least one signal from the transmitter.

The first display unit may display a hologram output.

The kidnapping notification system may further include a primary power source disposed within at least a portion of the notification device to provide power to the notification device and the first display unit.

The kidnapping notification system may further include a second power source disposed on at least a portion of the notification device to charge the primary power source using a solar cell.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
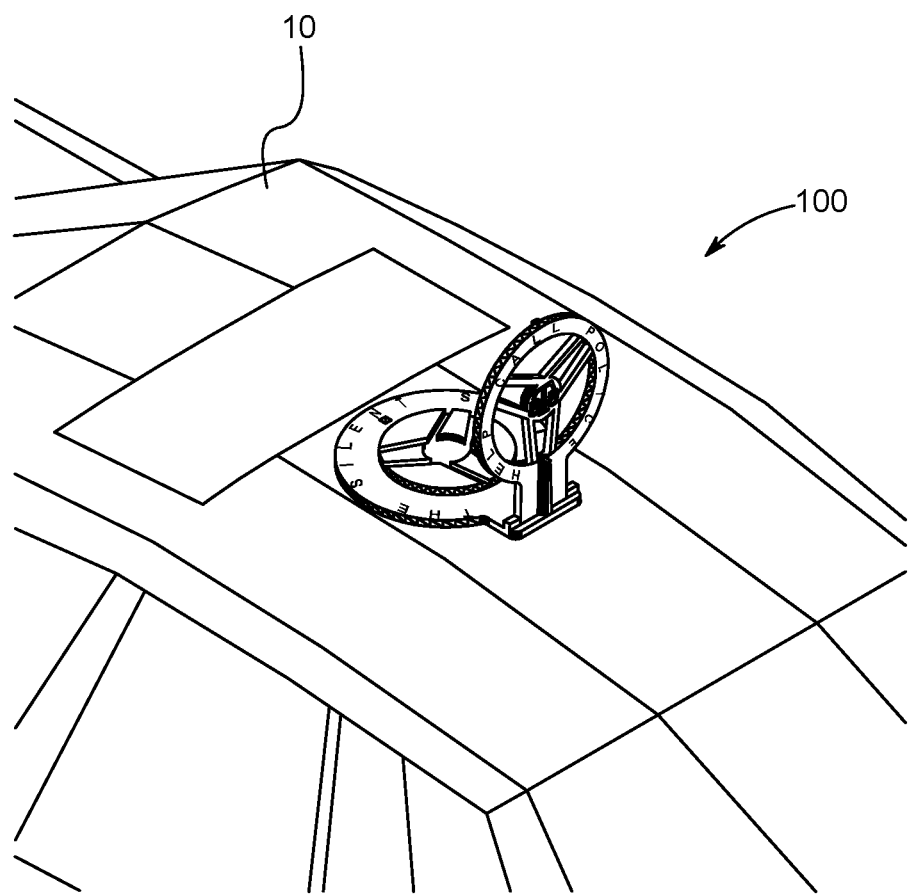
FIG. 1 illustrates an isometric view of a kidnapping notification system disposed on a vehicle, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Kidnapping Notification System 100
Notification Device 110
Base 111
Pivoting Section 112
Apertures 113
Hinge 114
Support Section 115
Latch 116
First Display Unit 120
First Section 121
Second Section 122
Second Display Unit 130
Camera 140
Communication Unit 150
Primary Power Source 160
Secondary Power Source 170
Fasteners 180
Transmitter 190
Button 191
Communication Unit 192
Kidnapping Notification System 200
Notification Device 210
Base 211
Pivoting Section 212
Springs 213
Hinge 214
Support Section 215
Latch 216
First Display Unit 220
Second Display Unit 230
Camera 240
Communication Unit 250
Primary Power Source 260
Secondary Power Source 270
Fasteners 280
Transmitter 290
Button 291
Communication Unit 292

FIG. 1 illustrates an isometric view of a kidnapping notification system 100 disposed on a vehicle 10, according to an exemplary embodiment of the present general inventive concept.

Figure 2A:
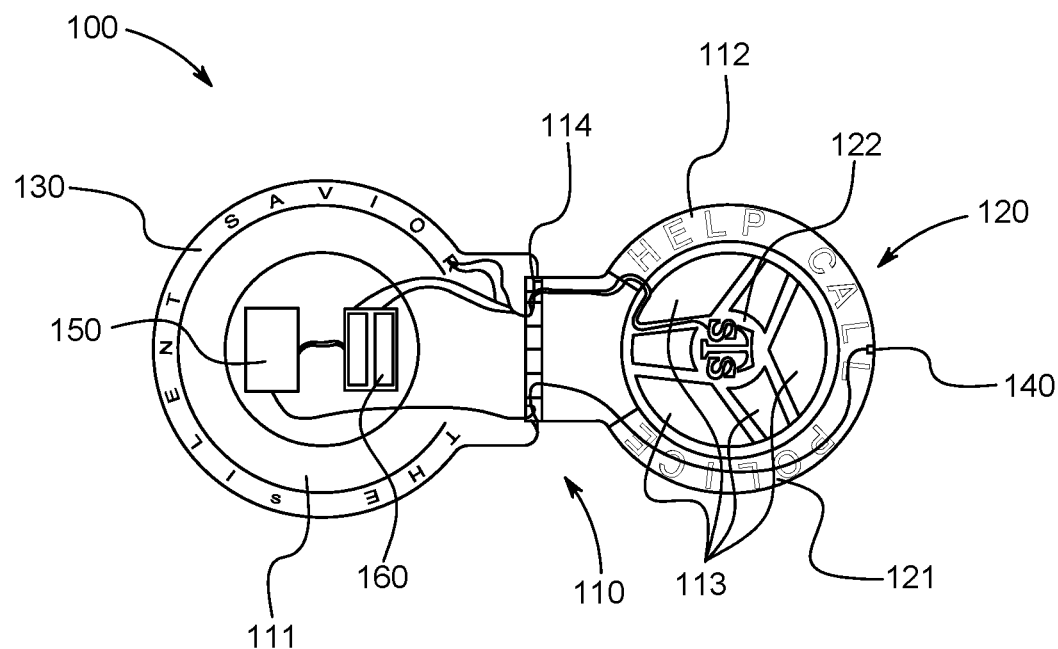
FIG. 2A illustrates a sectional view of a notification device in an opened position, according to an exemplary embodiment of the present general inventive concept.

FIG. 2A illustrates a sectional view of a notification device 110 in an opened position, according to an exemplary embodiment of the present general inventive concept.

Figure 2B:
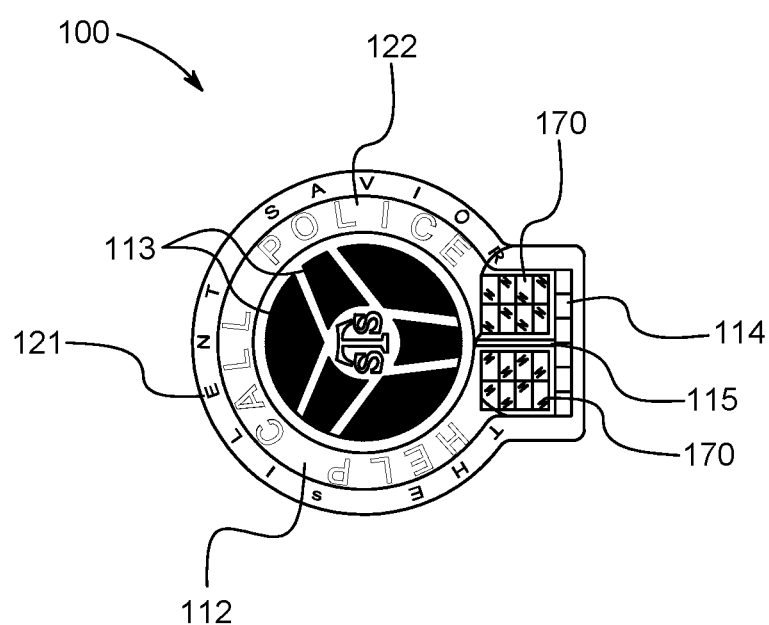
FIG. 2B illustrates a top view of the notification device in a closed position, according to an exemplary embodiment of the present general inventive concept.

FIG. 2B illustrates a top view of the notification device 110 in a closed position, according to an exemplary embodiment of the present general inventive concept.

Figure 2C:
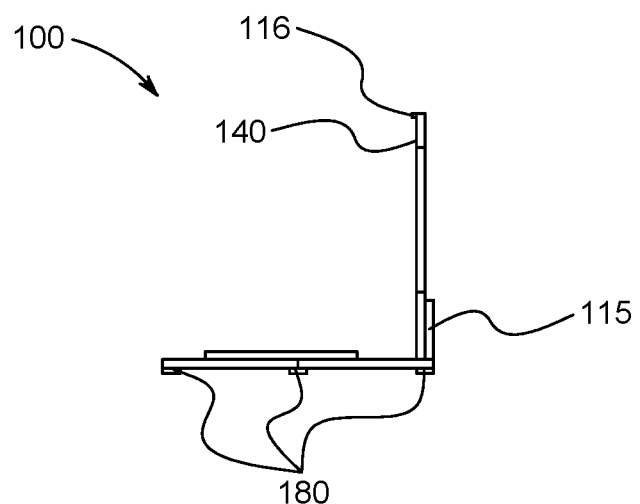
FIG. 2C illustrates an elevational side view of the notification device, according to an exemplary embodiment of the present general inventive concept.

FIG. 2C illustrates an elevational side view of the notification device 110, according to an exemplary embodiment of the present general inventive concept.

Figure 2D:
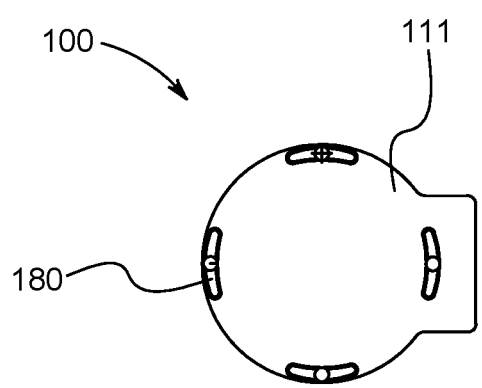
FIG. 2D illustrates an elevational bottom view of the notification device, according to an exemplary embodiment of the present general inventive concept.

FIG. 2D illustrates an elevational bottom view of the notification device 110, according to an exemplary embodiment of the present general inventive concept.

Figure 3:
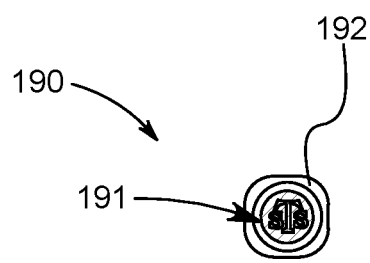
FIG. 3 illustrates a top view of a transmitter, according to an exemplary embodiment of the present general inventive concept.

FIG. 3 illustrates a top view of a transmitter 190, according to an exemplary embodiment of the present general inventive concept.

The kidnapping notification system 100 may be constructed from at least one of metal, plastic, wood, glass, and rubber, etc., but is not limited thereto.

The kidnapping notification system 100 may include a notification device 110, a first display unit 120, a second display unit 130, at least one camera 140, a communication unit 150, a primary power source 160, a secondary power source 170, a plurality of fasteners 180, and a transmitter 190, but is not limited thereto.

Referring to FIGS. 1 through 2B, the notification device 110 is illustrated to have a circular shape. However, the notification device 110 may be rectangular, conical, triangular, pentagonal, hexagonal, heptagonal, octagonal, or any other shape known to one of ordinary skill in the art, but is not limited thereto.

The notification device 110 may include a base 111, a pivoting section 112, a plurality of apertures 113, a hinge 114, a support section 115, and a latch 116, but is not limited thereto.

The base 111 may be removably connected to at least a portion of a vehicle 10, such as a roof of the vehicle 10.

Referring to FIGS. 1, 2A, and 2C, the pivoting section 112 is illustrated in the opened position. Referring to FIG. 2B, the pivoting section 112 is illustrated in the closed position. The pivoting section 112 may be pivotally disposed on at least a portion of the base 111. The pivoting section 112 may move (i.e. pivot) from closed against the base 111 in a first position to at least partially opened away from the base 111 in a second position. Conversely, the pivoting section 112 may move from opened in the second position to closed in the first position.

The plurality of apertures 113 may be disposed on at least a portion of a center portion of the pivoting section 112. Moreover, the plurality of apertures 113 may allow air to move therethrough. As such, the plurality of apertures 113 may reduce resistance of the pivoting section 112 in response to moving through the air, such as during movement of the vehicle 10.

The hinge 114 may include a spring, but is not limited thereto.

The hinge 114 may springingly connect the pivoting section 112 to the base 111. Also, the hinge 114 may facilitate movement of the pivoting section 112 with respect to the base 111. Additionally, the hinge 114 may be spring biased to move the pivoting section 112 from the first position to the second position in a rapid manner (e.g., less than and/or equal to three seconds).

The support section 115 may include an antenna, but is not limited thereto.

The support section 115 may be disposed on at least a portion of an outer surface of the pivoting section 112. The support section 115 may support the pivoting section 112 in the second position. In other words, the support section 115 may increase resistance to lateral movement of the pivoting section 112 in the second position during movement through the air on the vehicle 10. As such, the support section 115 may prevent the pivoting section 112 from lying flat on the vehicle 10 opposite to being connected to the base 111 while moving (e.g., lying one-hundred and eighty degrees with respect to the base 111 due to resistance from the air during movement).

Furthermore, the support section 115 may operate as the antenna to receive at least one signal thereto.

The latch 116 may be disposed on at least a portion of the pivoting section 112. Moreover, the latch 116 may include a solenoid, such that the solenoid may retract the latch 116 in response to rotation thereof.

The first display unit 120 may be constructed as a plasma screen, an LCD screen, a light emitting diode (LED) screen, an organic LED (OLED) screen, a computer monitor, a hologram output unit, a sound outputting unit, an LED light, or any other type of device that visually or aurally displays data.

The first display unit 120 may include a first section 121 and a second section 122, but is not limited thereto.

Referring to FIG. 2B, the first section 121 may be disposed on at least a portion of the pivoting section 112. The second section 122 may be disposed on at least a portion of the center portion of the pivoting section 112. More specifically, the first section 121 may be disposed around a perimeter of the second section 122, such that the second section 122 may be disposed between the first section 121 and/or the plurality of apertures 113. Also, the first section 121 may illuminate a first color (e.g., blue) to indicate a proper operation of the notification device 110. The second section 122 may illuminate a second color (e.g., red) to indicate a kidnapping of a user in the vehicle 20. As such, the first section 121 and/or the second section 122 may alert at least one third party (e.g., other drivers, police, pedestrians) that the user is in need of assistance due to a threat to the user by a kidnapper in the vehicle 20.

Furthermore, the first section 121 and/or the second section 122 may illuminate a steady light, a flashing light, and/or display a message such as "HELP CALL 911," "HELP CALL POLICE," and/or any other message to indicate an emergency. Additionally, the first section 121 and/or the second section 122 may change the message, the color, and/or a speed of the flashing light during operation to draw more attention to the notification device 110.

The second display unit 130 may be constructed as a plasma screen, an LCD screen, a light emitting diode (LED) screen, an organic LED (OLED) screen, a computer monitor, a hologram output unit, a sound outputting unit, an LED light, or any other type of device that visually or aurally displays data.

Referring to FIG. 2A, the second display unit 130 may be disposed on at least a portion of the base 111. The second display unit 130 may illuminate the first color and/or the second color similar to the first section 121 and/or the second section 122, respectively.

Furthermore, the second display unit 130 may illuminate a steady light, a flashing light, and/or display a message such as "HELP CALL 911," "HELP CALL POLICE," and/or any other message to indicate an emergency. Additionally, the second display unit 130 may change the message, the color, and/or a speed of the flashing light during operation to draw more attention to the notification device 110.

The at least one camera 140 may include any type of camera known to one of ordinary skill in the art, including, but not limited to, an action camera, an animation camera, an autofocus camera, a box camera, a camcorder, a camera phone, a compact camera, a dashboard camera (i.e., a Dashcam), a digital camera, a field camera, a FIREWIRE camera, a helmet camera, a high-speed camera, an instant camera, a keychain camera, a live-preview digital camera, a movie camera, an omnidirectional camera, a pinhole camera, a pocket camera, a pocket video camera, a rangefinder camera, a reflex camera, a remote camera, a stereo camera, a still camera, a still video camera, a subminiature camera, a system camera, a thermal imaging camera, a thermographic camera, a traffic camera, a traffic enforcement camera, a twin-lens reflex camera, a video camera, a view camera, a webcam, a WRIGHT camera, a ZENITH camera, a zoom-lens reflex camera.

The at least one camera 140 may be disposed on at least a portion of the pivoting section 112. Also, the at least one camera 140 may preferably have capabilities to store data on a storage device within the at least one camera 140. Moreover, the at least one camera 140 may record the data regarding movement of the notification device 110 during movement of the vehicle 10. Furthermore, the at least one camera 140 may send the data, such as images and/or video of movement of the notification device 110 to the at least one third party, such as police.

The communication unit 150 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The communication unit 150 may be disposed within at least a portion of the base 111. Additionally, the communication unit 150 may be connected to the support section 115 to receive the at least one signal from the antenna of the support section 115.

The primary power source 160 may include a battery, but is not limited thereto.

The primary power source 160 may be disposed within at least a portion of the base 111. The primary power source 160 may send power to the notification device 110, the first display unit 120, the second display unit 130, the at least one camera 140, and/or the communication unit 150.

The secondary power source 170 may include a solar cell, but is not limited thereto.

The secondary power source 170 may be disposed on at least a portion of the outer surface of the pivoting section 112. The secondary power source 170 may send power to the primary power source 160. In other words, the secondary power source 170 may charge the primary power source 160. Additionally, the secondary power source 170 may send power to the notification device 110, the first display unit 120, the second display unit 130, the at least one camera 140, and/or the communication unit 150.

The plurality of fasteners 180 may include a magnet, a bolt, a screw, a nail, a washer, a nut, an adhesive, and/or any combination thereof, but is not limited thereto.

The plurality of fasteners 180 may be disposed on at least a portion of an outer surface of the base 111. Moreover, the plurality of fasteners 180 may removably connect the base 111 to the vehicle 10.

The transmitter 190 may include a button 191 and a communication unit 192, but is not limited thereto.

Furthermore, the transmitter 190 may include a processing unit (e.g., a computer processing unit (CPU), microprocessor, microcontroller, etc.) and a storage unit (e.g., a hard disk drive (HDD), solid state drive (SSD), cloud storage, etc.) having a software application running thereon. For ease of description, the software application may be referred to as an app.

The transmitter 190 may be removably connected to at least a portion of the vehicle 10 and communicably connected to the communication unit 150. For example, the transmitter 190 may be removably connected to a steering column of the vehicle 10. In other words, the transmitter 190 may be connected to any discreet location of the vehicle 10 to prevent recognition by the kidnapper.

The button 191 may be disposed on at least a portion of the transmitter 190.

The communication unit 192 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The communication unit 192 may emit the at least one signal in response to depressing the button 191.

Accordingly, in operation, the communication unit 192 may send the at least one signal to the communication unit 150 via the support section 115. The communication unit 192 may retract the latch 116, such that the pivoting section 112 may move in response to retraction of the latch 116. Additionally, the communication unit 192 may turn on the first section 121 and/or the second section 122, the second display unit 130, and/or the at least one camera 140 in response to depressing the button 191. As such, the notification device 110, the first display unit 120, the second display unit 130, and/or the at least one camera 140 may alert the at least one third party of the emergency. The transmitter 190 may execute the app to perform all the same functions as described above.

Furthermore, an external control device, such as a mobile device, a cell phone, a tablet computer, a personal digital assistant (PDA), a laptop computer may include a processing unit (e.g., a computer processing unit (CPU), microprocessor, microcontroller, etc.) and a storage unit (e.g., a hard disk drive (HDD), solid state drive (SSD), cloud storage, etc.). The external control device may communicate to the communication unit 150. The external control device may access a network and/or the Internet to download the app thereon. Moreover, the external control device executing the app may turn on the first section 121 and/or the second section 122, the second display unit 130, and/or the at least one camera 140 in response to depressing the button 191. As such, the notification device 110, the first display unit 120, the second display unit 130, and/or the at least one camera 140 may alert the at least one third party of the emergency.

Therefore, the kidnapping notification system 100 may alert the at least one third party to prevent the kidnapping of the user.

Figure 4A:
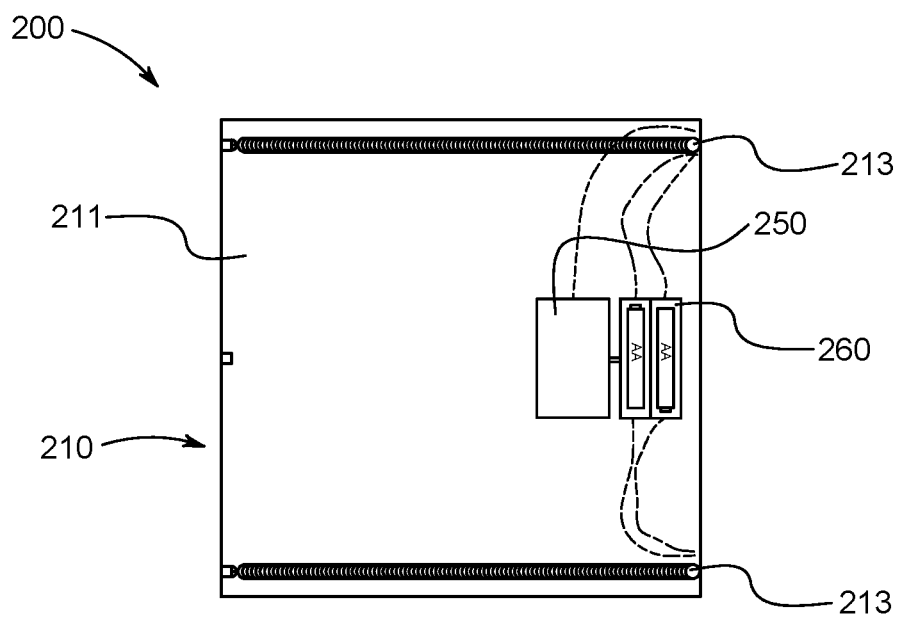
FIG. 4A illustrates a sectional view of a base of a notification device, according to another exemplary embodiment of the present general inventive concept.

FIG. 4A illustrates a sectional view of a base 211 of a notification device 210, according to another exemplary embodiment of the present general inventive concept.

Figure 4B:
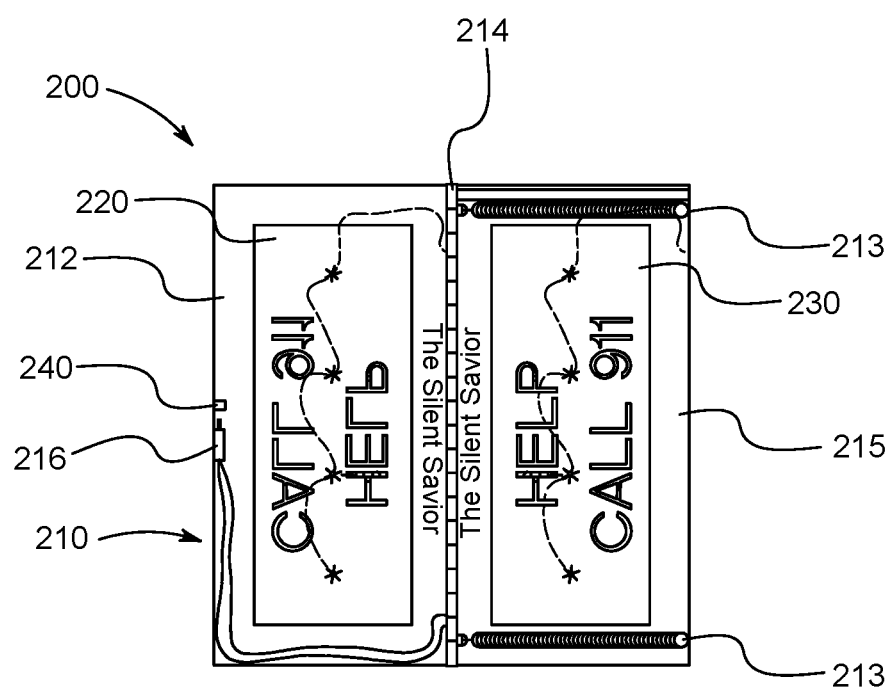
FIG. 4B illustrates a sectional view of a pivoting section of the notification device, according to another exemplary embodiment of the present general inventive concept.

FIG. 4B illustrates a sectional view of a pivoting section 212 of the notification device 210, according to another exemplary embodiment of the present general inventive concept.

Figure 4C:
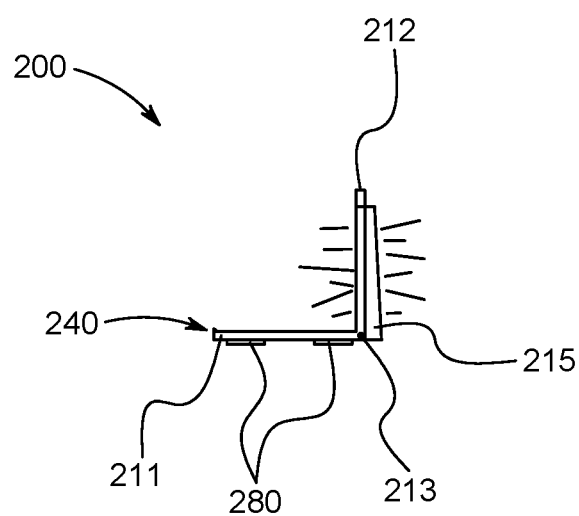
FIG. 4C illustrates an elevational side view of the notification device in an opened position, according to another exemplary embodiment of the present general inventive concept.

FIG. 4C illustrates an elevational side view of the notification device 210 in an opened position, according to another exemplary embodiment of the present general inventive concept.

Figure 4D:
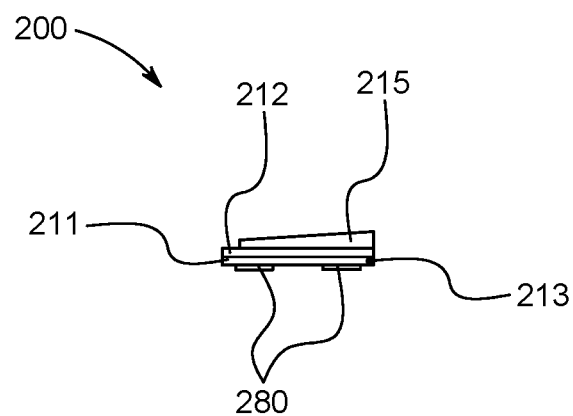
FIG. 4D illustrates an elevational side view of the notification device in a closed position, according to another exemplary embodiment of the present general inventive concept.

FIG. 4D illustrates an elevational side view of the notification device 210 in a closed position, according to another exemplary embodiment of the present general inventive concept.

Figure 4E:
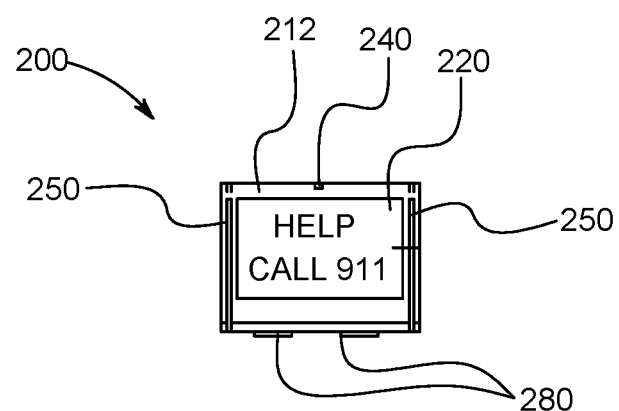
FIG. 4E illustrates an elevational front view of the notification device, according to another exemplary embodiment of the present general inventive concept.

FIG. 4E illustrates an elevational front view of the notification device 210, according to another exemplary embodiment of the present general inventive concept.

Figure 5:
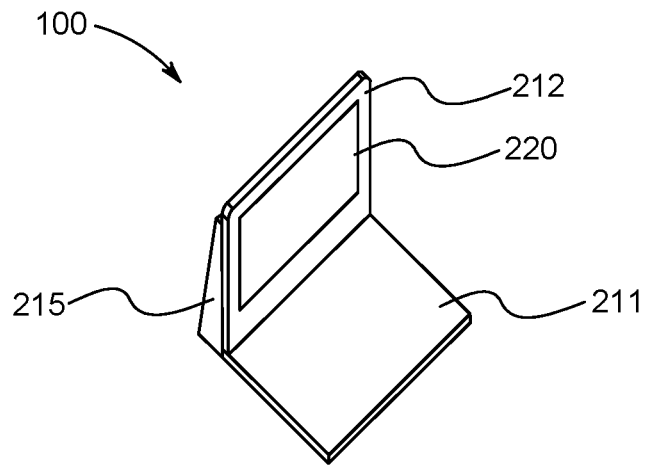
FIG. 5 illustrates an isometric view of a kidnapping notification system disposed on a vehicle, according to another exemplary embodiment of the present general inventive concept.

FIG. 5 illustrates an isometric view of a kidnapping notification system 200 disposed on a vehicle 10, according to another exemplary embodiment of the present general inventive concept.

Figure 6:
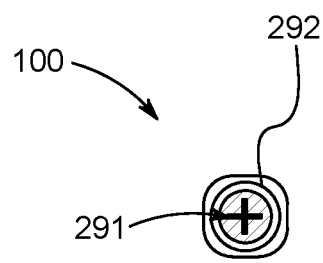
FIG. 6 illustrates a top view of a transmitter, according to another exemplary embodiment of the present general inventive concept.

FIG. 6 illustrates a top view of a transmitter 290, according to another exemplary embodiment of the present general inventive concept.

The kidnapping notification system 200 may be constructed from at least one of metal, plastic, wood, glass, and rubber, etc., but is not limited thereto.

The kidnapping notification system 200 may include a notification device 210, a first display unit 220, a second display unit 230, at least one camera 240, a communication unit 250, a primary power source 260, a secondary power source 270, a plurality of fasteners 280, and a transmitter 290, but is not limited thereto.

Referring to FIGS. 4A through 5, the notification device 210 is illustrated to have a rectangular shape. However, the notification device 210 may be a rectangular prism, circular, conical, triangular, pentagonal, hexagonal, heptagonal, octagonal, or any other shape known to one of ordinary skill in the art, but is not limited thereto.

The notification device 210 may include a base 211, a pivoting section 212, a plurality of springs 213, a hinge 214, a support section 215, and a latch 216, but is not limited thereto.

The base 211 may be removably connected to at least a portion of a vehicle 10, such as a roof of the vehicle 10.

Referring to FIGS. 4C and 5, the pivoting section 212 is illustrated in the opened position. Referring to FIG. 4D, the pivoting section 212 is illustrated in the closed position. The pivoting section 212 may be pivotally disposed on at least a portion of the base 211. The pivoting section 212 may move (i.e. pivot) from closed against the base 211 in a first position to at least partially opened away from the base 211 in a second position. Conversely, the pivoting section 212 may move from opened in the second position to closed in the first position.

Referring to FIGS. 4A and 4B, the plurality of springs 213 may be disposed on at least a portion of a first side and/or a second side of the base 211 and/or the pivoting section 212. Moreover, the plurality of springs 213 may facilitate movement of the pivoting section 212 from the first position to the second position in a rapid manner (e.g., less than and/or equal to three seconds).

The hinge 214 may connect the pivoting section 212 to the base 211. Also, the hinge 214 may facilitate movement of the pivoting section 212 with respect to the base 211.

The support section 215 may include an antenna, but is not limited thereto.

The support section 215 may be disposed on at least a portion of an outer surface of the pivoting section 212. The support section 215 may support the pivoting section 212 in the second position. In other words, the support section 215 may increase resistance to lateral movement of the pivoting section 212 in the second position during movement through the air on the vehicle 10. As such, the support section 215 may prevent the pivoting section 212 from lying flat on the vehicle 10 opposite to being connected to the base 211 while moving (e.g., lying one-hundred and eighty degrees with respect to the base 211 due to resistance from the air during movement).

Furthermore, the support section 215 may operate as the antenna to receive at least one signal thereto.

The latch 216 may be disposed on at least a portion of the base 211. Moreover, the latch 216 may include a solenoid, such that the solenoid may retract the latch 216 in response to rotation thereof.

The first display unit 220 may be constructed as a plasma screen, an LCD screen, a light emitting diode (LED) screen, an organic LED (OLED) screen, a computer monitor, a hologram output unit, a sound outputting unit, an LED light, or any other type of device that visually or aurally displays data.

Referring to FIG. 2B, the first display unit 220 may be disposed on at least a portion of the pivoting section 212. Moreover, the first display unit 220 may illuminate (i.e. a first color and/or a second color) to indicate a kidnapping of a user in the vehicle 20. As such, the first display unit 220 may alert at least one third party (e.g., other drivers, police, pedestrians) that the user is in need of assistance due to a threat to the user by a kidnapper in the vehicle 20.

Furthermore, the first display unit 220 may illuminate a steady light, a flashing light, and/or display a message such as "HELP CALL 911," "HELP CALL POLICE," and/or any other message to indicate an emergency. Additionally, the first display unit 220 may change the message, the color, and/or a speed of the flashing light during operation to draw more attention to the notification device 210.

The second display unit 230 may be constructed as a plasma screen, an LCD screen, a light emitting diode (LED) screen, an organic LED (OLED) screen, a computer monitor, a hologram output unit, a sound outputting unit, an LED light, or any other type of device that visually or aurally displays data.

Referring to FIGS. 4B and 4C, the second display unit 230 may be disposed on at least a portion of the support section 215. The second display unit 230 may illuminate the first color and/or the second color similar to the first display unit 220.

Furthermore, the second display unit 230 may illuminate a steady light, a flashing light, and/or display a message such as "HELP CALL 911," "HELP CALL POLICE," and/or any other message to indicate an emergency. Additionally, the second display unit 230 may change the message, the color, and/or a speed of the flashing light during operation to draw more attention to the notification device 210.

The at least one camera 240 may include any type of camera known to one of ordinary skill in the art, including, but not limited to, an action camera, an animation camera, an autofocus camera, a box camera, a camcorder, a camera phone, a compact camera, a dashboard camera (i.e., a Dashcam), a digital camera, a field camera, a FIREWIRE camera, a helmet camera, a high-speed camera, an instant camera, a keychain camera, a live-preview digital camera, a movie camera, an omnidirectional camera, a pinhole camera, a pocket camera, a pocket video camera, a rangefinder camera, a reflex camera, a remote camera, a stereo camera, a still camera, a still video camera, a subminiature camera, a system camera, a thermal imaging camera, a thermographic camera, a traffic camera, a traffic enforcement camera, a twin-lens reflex camera, a video camera, a view camera, a webcam, a WRIGHT camera, a ZENITH camera, a zoom-lens reflex camera.

The at least one camera 240 may be disposed on at least a portion of the pivoting section 212. Also, the at least one camera 240 may preferably have capabilities to store data on a storage device within the at least one camera 240. Moreover, the at least one camera 240 may record the data regarding movement of the notification device 210 during movement of the vehicle 10. Furthermore, the at least one camera 240 may send the data, such as images and/or video of movement of the notification device 210 to the at least one third party, such as police.

The communication unit 250 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The communication unit 250 may be disposed within at least a portion of the base 211. Additionally, the communication unit 250 may be connected to the support section 215 to receive the at least one signal from the antenna of the support section 215.

The primary power source 260 may include a battery, but is not limited thereto.

The primary power source 260 may be disposed within at least a portion of the base 211. The primary power source 260 may send power to the notification device 210, the first display unit 220, the second display unit 230, the at least one camera 240, and/or the communication unit 250.

The secondary power source 270 may include a solar cell, but is not limited thereto.

The secondary power source 270 may be disposed on at least a portion of the outer surface of the pivoting section 212. The secondary power source 270 may send power to the primary power source 260. In other words, the secondary power source 270 may charge the primary power source 260. Additionally, the secondary power source 270 may send power to the notification device 210, the first display unit 220, the second display unit 230, the at least one camera 240, and/or the communication unit 250.

The plurality of fasteners 280 may include a magnet, a bolt, a screw, a nail, a washer, a nut, an adhesive, and/or any combination thereof, but is not limited thereto.

The plurality of fasteners 280 may be disposed on at least a portion of an outer surface of the base 211. Moreover, the plurality of fasteners 280 may removably connect the base 211 to the vehicle 10.

The transmitter 290 may include a button 291 and a communication unit 292, but is not limited thereto.

Furthermore, the transmitter 290 may include a processing unit (e.g., a computer processing unit (CPU), microprocessor, microcontroller, etc.) and a storage unit (e.g., a hard disk drive (HDD), solid state drive (SSD), cloud storage, etc.) having a software application running thereon. For ease of description, the software application may be referred to as an app.

The transmitter 290 may be removably connected to at least a portion of the vehicle 10 and communicably connected to the communication unit 150. For example, the transmitter 290 may be removably connected to a steering column of the vehicle 10. In other words, the transmitter 290 may be connected to any discreet location of the vehicle 10 to prevent recognition by the kidnapper.

The button 291 may be disposed on at least a portion of the transmitter 290.

The communication unit 292 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, Firewire, and Ethernet.

The communication unit 292 may emit the at least one signal in response to depressing the button 291.

Accordingly, in operation, the communication unit 292 may send the at least one signal to the communication unit 250 via the support section 215. The communication unit 192 may retract the latch 216, such that the pivoting section 212 may move in response to retraction of the latch 216. Additionally, the communication unit 292 may turn on the first display unit 220, the second display unit 230, and/or the at least one camera 240 in response to depressing the button 291. As such, the notification device 210, the first display unit 220, the second display unit 230, and/or the at least one camera 240 may alert the at least one third party of the emergency. The transmitter 290 may execute the app to perform all the same functions as described above. The transmitter 290 may execute the app to perform all the same functions as described above.

Furthermore, an external control device, such as a mobile device, a cell phone, a tablet computer, a personal digital assistant (PDA), a laptop computer may include a processing unit (e.g., a computer processing unit (CPU), microprocessor, microcontroller, etc.) and a storage unit (e.g., a hard disk drive (HDD), solid state drive (SSD), cloud storage, etc.). The external control device may communicate to the communication unit 250. The external control device may access a network and/or the Internet to download the app thereon. Moreover, the external control device executing the app may turn on the first display unit 220, the second display unit 230, and/or the at least one camera 240 in response to depressing the button 291. As such, the notification device 210, the first display unit 220, the second display unit 230, and/or the at least one camera 240 may alert the at least one third party of the emergency.

Therefore, the kidnapping notification system 200 may alert the at least one third party to prevent the kidnapping of the user.

The present general inventive concept may include a kidnapping notification system 100, including a notification device 110 to removably connect to at least a portion of a vehicle 10, a first display unit 120 disposed on at least a portion of the notification device 110 to alert at least one third party of a threat to a user, and a transmitter 190 removably connected to at least a portion of the vehicle 10 to adjust a position of the notification device 110.

The notification device 110 may include a base 111, and a pivoting section 112 pivotally disposed on at least a portion of the base 111 to move in response to use of the transmitter 190.

The notification device 110 may further include a hinge 114 springingly disposed on at least a portion of the base 111 to move the pivoting section 112 from closed against the base 111 in a first position to at least partially opened away from the base 111 in a second position.

The hinge 114 may move the pivoting section 112 from closed against the base 111 in the first position to at least partially opened away from the base 111 in the second position within three seconds.

The notification device 110 may further include a plurality of springs 213 disposed on at least a portion of a first side and a second side of the base 211 to move the pivoting section 212 from closed against the base 211 in a first position to at least partially opened away from the base 211 in a second position.

The plurality of springs 213 may move the pivoting section 212 from closed against the base 211 in the first position to at least partially opened away from the base 211 in the second position within three seconds.

The notification device 100 may further include a support section 115 disposed on at least a portion of the pivoting section 112 to prevent the pivoting section 112 from moving one-hundred and eighty degrees with respect to the base 111.

The first display unit 120 may illuminate at least one of a steady light and a flashing light to indicate an emergency.

The first display unit 120 may change at least one of a color and a speed of flashing during operation to increase attention from the at least one third party.

The first display unit 120 may illuminate a particular color that identifies a kidnapping within the vehicle 10 is in progress in response to use of the transmitter 190.

The first display unit 120 may display a first message to indicate an emergency.

The first display unit 120 may display the first message as at least one of HELP CALL 911 and HELP CALL POLICE.

The first display unit 120 may change the first message during operation to increase attention from the at least one third party.

The kidnapping notification system 100 may further include a second display unit 130 disposed on at least a portion of the notification device 110 to display a second message different from the first message to indicate the emergency.

The kidnapping notification system 100 may further include at least one camera 140 disposed on at least a portion of the pivoting section 112 to record data regarding movement of the notification device 110 during movement of the vehicle 10 and send the data to at least one third party.

The kidnapping notification system 100 may further include a communication unit 150 disposed within at least a portion of the notification device 110 to receive at least one signal from the transmitter 190.

The first display unit 120 may display a hologram output.

The kidnapping notification system 100 may further include a primary power source 160 disposed within at least a portion of the notification device to provide power to the notification device and the first display unit.

The kidnapping notification system may further include a second power source 170 disposed on at least a portion of the notification device 110 to charge the primary power 160 source using a solar cell.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A kidnapping notification system, comprising:
   a notification device to removably connect to at least a portion of a vehicle;
   a first display unit disposed on at least a portion of the notification device to alert at least one third party of a threat to a user; and
   a transmitter removably connected to at least a portion of the vehicle to adjust a position of the notification device.

2. The kidnapping notification system of claim 1, wherein the notification device comprises:
   a base; and
   a pivoting section pivotally disposed on at least a portion of the base to move in response to use of the transmitter.

3. The kidnapping notification system of claim 2, wherein the notification device further comprises:
   a hinge springingly disposed on at least a portion of the base to move the pivoting section from closed against the base in a first position to at least partially opened away from the base in a second position.

4. The kidnapping notification system of claim 3, wherein the hinge moves the pivoting section from closed against the base in the first position to at least partially opened away from the base in the second position within three seconds.

5. The kidnapping notification system of claim 2, wherein the notification device further comprises:
   a plurality of springs disposed on at least a portion of a first side and a second side of the base to move the pivoting section from closed against the base in a first position to at least partially opened away from the base in a second position.

6. The kidnapping notification system of claim 5, wherein the plurality of springs moves the pivoting section from closed against the base in the first position to at least partially opened away from the base in the second position within three seconds.

7. The kidnapping notification system of claim 2, wherein the notification device further comprises:
   a support section disposed on at least a portion of the pivoting section to prevent the pivoting section from moving one-hundred and eighty degrees with respect to the base.

8. The kidnapping notification system of claim 1, wherein the first display unit illuminates at least one of a steady light and a flashing light to indicate an emergency.

9. The kidnapping notification system of claim 1, wherein the first display unit changes at least one of a color and a speed of flashing during operation to increase attention from the at least one third party.

10. The kidnapping notification system of claim 1, wherein the first display unit illuminates a particular color that identifies a kidnapping within the vehicle is in progress in response to use of the transmitter.

11. The kidnapping notification system of claim 1, wherein the first display unit displays a first message to indicate an emergency.

12. The kidnapping notification system of claim 1, wherein the first display unit displays the first message as at least one of HELP CALL 911 and HELP CALL POLICE.

13. The kidnapping notification system of claim 11, wherein the first display unit changes the first message during operation to increase attention from the at least one third party.

14. The kidnapping notification system of claim 11, further comprising:
   a second display unit disposed on at least a portion of the notification device to display a second message different from the first message to indicate the emergency.

15. The kidnapping notification system of claim 1, further comprising:

at least one camera disposed on at least a portion of the pivoting section to record data regarding movement of the notification device during movement of the vehicle and send the data to at least one third party.

16. The kidnapping notification system of claim 1, further comprising:
a communication unit disposed within at least a portion of the notification device to receive at least one signal from the transmitter.

17. The kidnapping notification system of claim 1, wherein the first display unit displays a hologram output.

18. The kidnapping notification system of claim 1, further comprising:
a primary power source disposed within at least a portion of the notification device to provide power to the notification device and the first display unit.

19. The kidnapping notification system of claim 18, further comprising:
a second power source disposed on at least a portion of the notification device to charge the primary power source using a solar cell.

\* \* \* \* \*